United States Patent [19]

Swartz et al.

[11] Patent Number: 5,180,986

[45] Date of Patent: Jan. 19, 1993

[54] TWO AXIS CAPACITIVE INCLINATION SENSOR

[75] Inventors: Harold L. Swartz; Warren W. Stansberry, both of Phoenix; Jeffrey C. Heidel, Glen Dale; Bradley D. Carlson, Glen Dale, all of Ariz.

[73] Assignee: Schaevitz Sensing Systems, Inc., Phoenix, Ariz.

[21] Appl. No.: 775,593

[22] Filed: Oct. 15, 1991

Related U.S. Application Data

[62] Division of Ser. No. 355,014, May 22, 1989, Pat. No. 5,079,847.

[51] Int. Cl.⁵ .................. G01R 27/26; G01C 9/06
[52] U.S. Cl. .................. 324/660; 324/690; 73/516 LM; 33/366
[58] Field of Search ............ 324/658, 660, 663, 665, 324/671, 674, 676, 678, 686, 690; 340/870.37; 33/366, 377, 389, 390; 73/516 LM

[56] References Cited

U.S. PATENT DOCUMENTS

| | | | |
|---|---|---|---|
| 2,338,811 | 1/1944 | Hasbrook | 33/206 |
| 2,633,028 | 10/1953 | Fillebrown | 74/5.6 |
| 2,711,590 | 6/1955 | Wilcox | 33/206 |
| 2,936,411 | 5/1960 | Doty | 317/246 |
| 3,096,591 | 7/1963 | Higgins, Jr. | 33/206 |
| 3,101,554 | 8/1963 | Gottula | 33/212 |
| 4,377,912 | 3/1983 | Hakhverdian | 33/366 |
| 4,422,243 | 12/1983 | Brunson et al. | 33/366 |
| 4,521,973 | 6/1985 | Wiklund et al. | 33/366 |
| 4,583,296 | 4/1986 | Dell'Acqua | 33/366 |
| 4,660,290 | 4/1987 | Hori et al. | 33/366 |
| 4,663,589 | 5/1987 | Fiori, Jr. | 324/208 |
| 4,676,103 | 6/1987 | Nakajima | 73/516 |
| 4,700,479 | 10/1987 | Saito et al. | 33/366 |
| 4,707,927 | 11/1987 | Hiyama | 33/366 |

FOREIGN PATENT DOCUMENTS

| | | |
|---|---|---|
| 0196735 | 1/1986 | European Pat. Off. . |
| 3406174C2 | 1/1986 | Fed. Rep. of Germany . |
| WO83/01304 | 4/1983 | PCT Int'l Appl. . |
| 0485308 | 9/1975 | U.S.S.R. .................. 33/366 |
| 1428918 | 7/1988 | U.S.S.R. .................. 33/366 |
| 2070774A | 2/1980 | United Kingdom . |
| 2059068A | 8/1980 | United Kingdom . |

*Primary Examiner*—Gerard R. Strecker
*Assistant Examiner*—Diep Do
*Attorney, Agent, or Firm*—Nixon & Vanderhye

[57] ABSTRACT

A two axis sensor is provided for detecting angular movement relative to either of two mutually perpendicular axes. The device includes a two-axis sensor comprising an upwardly directed, spherically shaped common electrode, an upwardly directed spherically shaped insulating member uniformly spaced from the common electrode to form a cavity therebetween, the common electrode and the insulating member being sealed to each other about respective peripheries thereof, with a dielectric fluid contained in the cavity, a plurality of detecting electrodes provided on an underside of the insulating member, the detecting electrodes formed by a selectively applied conductive surface coating on the underside, and means for detecting variations in capacitance proportional to movement of the sensor relative to each of two mutually perpendicular axes by reason of movement of the dielectric fluid within the cavity.

10 Claims, 5 Drawing Sheets

TWO AXIS CAPACITIVE INCLINATION SENSOR

This is a division of application Ser. No. 07/355,014, filed May 22, 1989, now U.S. Pat. No. 5,079,847.

BACKGROUND AND SUMMARY OF THE INVENTION

The present invention relates to a sensor and related circuitry for detecting movement or inclination of an object relative to either of two mutually perpendicular axes.

More specifically, the present invention relates to a sensor incorporating four parallel plate capacitors arranged to detect changes in capacitance proportional to angular changes of the sensor relative to each of the two mutually perpendicular axes. These changes in capacitance are electrically conditioned to output voltage signals proportional to the angular changes of the sensor.

Inclination sensors utilizing electrostatic capacitive effects are known in the art. For example, U.S. Pat. No. 4,707,927 discloses an inclination and acceleration sensor having two spaced apart hemispherical domes with the space between the domes containing a viscous fluid. One side of the construction supports a common electrode, while the other side supports a plurality of detecting electrodes. In its normal orientation, the sensor is arranged such that the hemispherical domes are upwardly concave so that the viscous fluid collects at the center or lowermost point of the spherical sensor, with a ring of air surrounding the fluid. By means of the movement of the viscous fluid which occurs during inclination of the sensor, electrostatic capacity between the common electrode and each of the detecting electrodes varies, and this variance is detected and output in the form of voltage signals.

U.S. Pat. No. 4,422,243 discloses a dual axis capacitive inclination sensor wherein a lower common electrode is mounted on a flat, lower surface, and a plurality of upper electrodes are mounted on a flat outer surface of the upper part of a transducer. The cavity between the electrodes has a partially spherical surface.

Other capacitive type sensors are disclosed in U.S. Pat. No. 4,377,912; UK Patent Application 2 070 774A; European Patent Application 0 196 735; PCT Publication WO 83/01304; Swedish Patent SE456040; and German Patent DE3406174C2.

The present invention relates to a novel and low cost construction for a two axis capacitive inclination sensor, and to related circuitry which provides reliable and accurate indication of angular movement about either of two mutually perpendicular axes.

In one exemplary embodiment of the invention, an outer housing is provided which has a substantially upwardly spherical portion and a peripheral base or flange portion, preferably constructed of an injection molded, electrically conductive plastic material. An inner housing is provided in the form of a thin film of non-conductive plastic material, which is supported and maintained in a substantially spherical shape by a pair of plastic arches which are integrally molded as reinforcing ribs on the underside of the film, extending perpendicular to one another, intersecting at the apex of a dome formed thereby. The arrangement of the ribs or arches separates the underside of the film into four discrete, substantially identical surface areas or sections which are coated with a conductive material. Each area or section is electrically connected to a circuit board or card through elastomeric connectors. The outer housing and inner housing are hermetically sealed about their respective flange areas, but with the spherical portions uniformly spaced from each other to form a cavity therebetween which is partially filled with a dielectric fluid, preferably to approximately 50% of the available volume within the cavity. In this arrangement, the dielectric fluid is normally concentrated about the lowermost peripheral portion of the cavity leaving a pocket of air or bubble lying above the fluid and substantially in the center of the sensor, at its apex.

As a result of this construction, it will be appreciated that four variable parallel plate capacitors are formed wherein the outer housing forms one electrode plate common to all four capacitors, and wherein the conductive coating on the four concave sections on the underside of the inner housing defines detecting electrodes, with the dielectric fluid 40 located between the common plate and the insulating, outer surface of the inner housing. The manner in which the conductive coating is applied to the underside of the inner housing is not critical to the invention, but it will be appreciated that coating the entire underside, including the reinforcing ribs or arches, and then selectively removing the coating along the underside of the respective ribs or arches is a simple and economical approach.

It will be understood by those skilled in the art that as the sensor tilts about a roll axis or a pitch axis, the amount of coverage of each of the coated sections by the dielectric fluid within the cavity varies, and this variance is detected and output in the form of DC voltage signals proportional to the angular movement of the sensor, as will be described in further detail below.

In a second exemplary embodiment of the invention, an outer housing is provided which is similar to the above described outer housing but which may be formed of a stamped sheet of ferrous or non-ferrous metal, with aluminum being preferred. Otherwise, the construction is similar in that the outer housing includes a spherical portion and a peripheral base or flange portion. The inner housing of this alternative embodiment also has a spherical central portion and a peripheral flange portion, but the inner housing can be thermally formed of a sheet material, or it can be molded into the desired shape such that no reinforcing ribs or arches utilized in the first embodiment are required. In this alternative embodiment, the concave or underside surface of the inner housing is selectively coated (or silk screened, or by other suitable means) with conductive material in a pattern which describes four detecting electrodes symmetrically arranged about the pitch axis and roll axis. The conductive coating on the inner concave surface of the inner housing extends into the peripheral flange portion to facilitate electrical contact with an associated circuit board or card.

Another feature of this alternative embodiment is that the outer housing is provided with a fill hole to facilitate introduction of dielectric fluid into the cavity between the inner and outer housings, which fill hole may be sealed with a plug. Alternatively, fluid may be added before the inner and outer housings are sealed.

Another feature of this alternative embodiment is the provision of a force distribution ring which, in conjunction with a plastic cover located beneath the sensor, provides attachment surfaces for fasteners which effect a clamping action between the distribution ring, the lower plastic cover and the peripheral flanges of the inner and outer housings.

Otherwise, the operation of this alternative embodiment is substantially the same as the first described embodiment.

Thus, it may be seen that the invention comprises in its broader aspects a sensor comprising a spherically shaped outer member having an outer convex surface and an inner concave surface defining a common electrode, a correspondingly shaped inner member having an outer convex insulating surface and an inner concave electrically conductive surface, and located within the outer member substantially uniformly spaced therefrom to form a cavity therebetween, a dielectric fluid contained in the cavity; the inner concave electrically conductive surface being divided into a plurality of detecting electrodes.

In addition to the sensor construction per se, the invention also relates to the provision of a suitable electronic circuit for utilization with the above described sensors.

The electronic circuit of the preferred embodiment is characterized by the utilization of a single oscillator for each axis of the sensor, and automatic switching between two capacitors after each single complete cycle of the oscillator, as described further herein.

Specifically, in the preferred embodiment sensor in accordance with the present invention two capacitors change capacitance for a given change in position along one of the sensing axes (e.g., either the pitch or the roll axis). An oscillator is operatively connected to one of the two capacitors and produces one period of an oscillation output signal—wherein the duration of the period is responsive to the capacitance of the one capacitor. At the conclusion of the oscillation period, the one capacitor is operatively disconnected from the oscillator and the other capacitor is operatively connected in its place. The oscillator then produces a further period of oscillation output signal—wherein the duration of this further period is responsive to the capacitance of this other capacitor.

An output circuit (a flip flop, a low pass filter, and an output buffer) may convert the oscillator output signal to a voltage level responsive to the relative durations of the two oscillator periods—and thus to the capacitances of the two sensor capacitors.

Other objects and advantages of the invention will be apparent from the detailed description of the invention which follows.

DETAILED DESCRIPTION OF THE DRAWINGS

Figure 1:
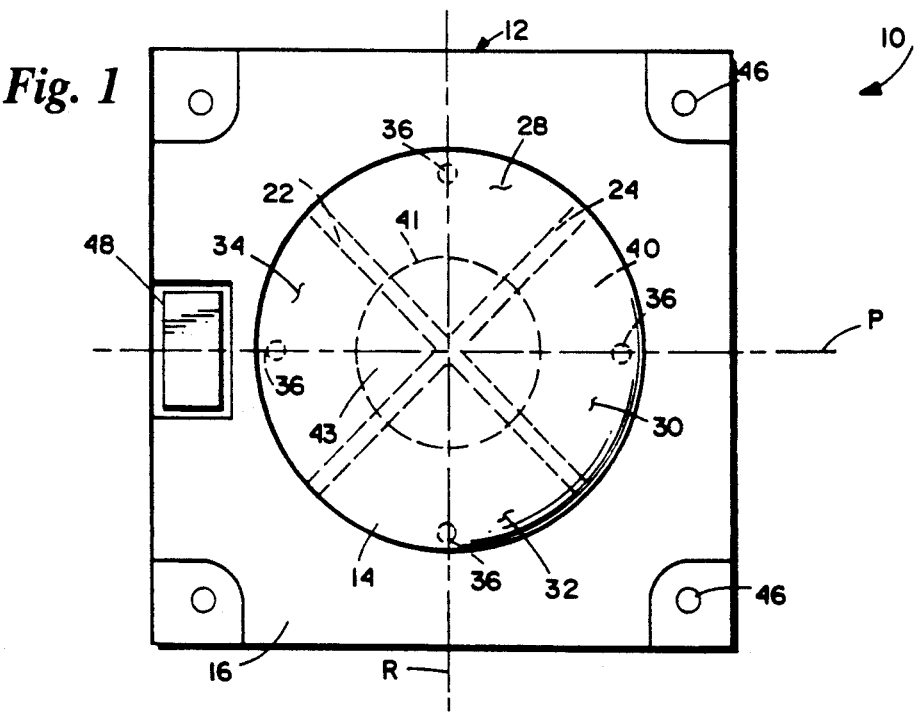
FIG. 1 is a plan view of a sensor in accordance with one exemplary embodiment of the invention.
Figure 2:
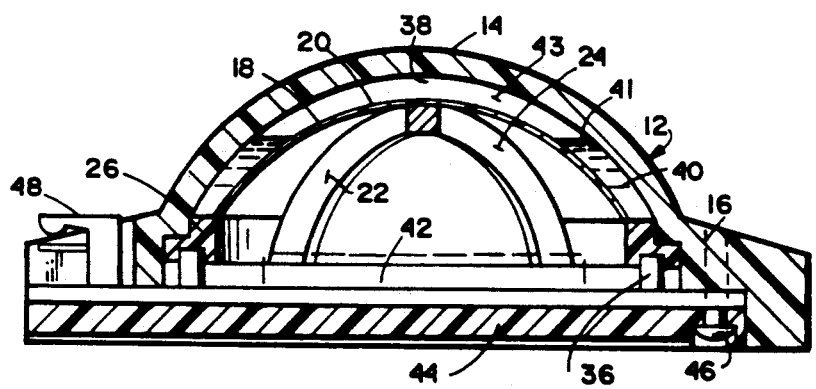
FIG. 2 is a side section view taken through a pitch axis P of the sensor shown in FIG. 1.
Figure 3:
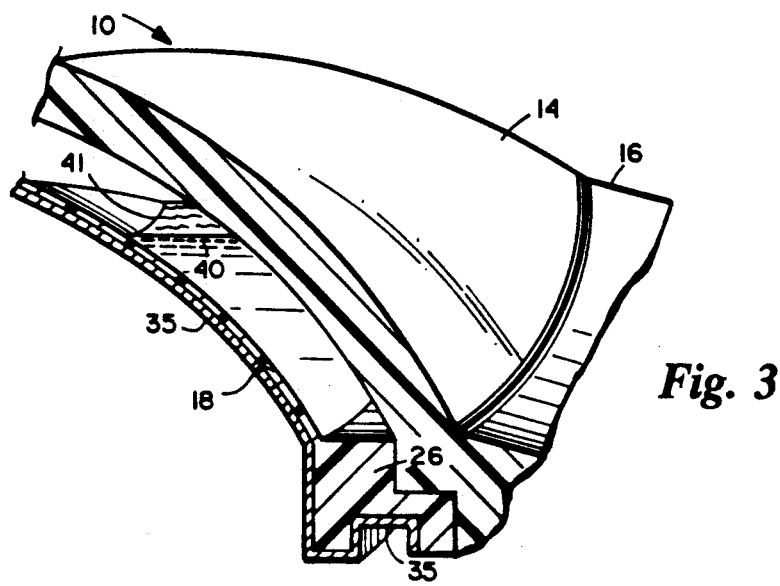
FIG. 3 is a partial perspective view of the inner and outer housings of the sensor shown in FIGS. 1 and 2.

With reference now to FIGS. 1 through 3, a two axis sensor 10 in accordance with a first exemplary embodiment of the invention is shown as comprising an outer housing 12 having a substantially spherical section 14 and a peripheral base portion 16. The housing 12 is preferably constructed of an injection molded, electrically conductive plastic material.

An inner housing 18 is formed by a plurality of components, including a thin film 20 molded of non-conductive plastic, and approximately 0.010 inch thick. The film is supported and maintained in a substantially spherical shape by a pair of integral plastic reinforcing ribs or arches 22, 24 which are arranged perpendicular to one another, intersecting at the apex of the dome formed by the film 20. The bases of the respective ribs or arches are molded into an annular base ring 26. This arrangement separates the underside of the film into four discrete, substantially identical sections 28, 30, 32 and 34, as best seen in FIG. 1.

The inner concave surface of each film section 28, 30, 32 and 34 is coated by any suitable means with a conductive material 35 that extends about the ring 26 (see FIG. 3) so as to contact four elastomeric connectors 36 located at the corners of the outer housing 12. As best seen in FIG. 2, the connector 36 is located approximately midway between adjacent portions of ribs 22, 24 in each of the sections 28, 30, 32 and 34.

The outer housing 12 and the film 20 of the inner housing 18 are uniformly spaced from each other to form a cavity 38 therebetween. With reference to FIG. 2, the inner and outer housings are assembled using conventional ultrasonic welding techniques so as to provide a hermetic seal between the two housings about the annular ring 26 where the latter engages outer housing 12 at the juncture of spherical section 14 and peripheral base portion 16.

The cavity 38 between the two housings is filled to 50% of the available volume with the dielectric fluid 40. Because the inner and outer housings are oriented in their level position such as to present a dome-shape with the apex of the dome at the uppermost surface of the sensor, the dielectric fluid normally falls by weight of gravity to the lowermost peripheral portion of the cavity 38 (FIG. 2), such that a substantially round fluid edge 41 partially defines a centrally located pocket of air 43 lying above the fluid 40 and below the apex of the outer housing 12.

The above described arrangement forms four variable parallel plate capacitors wherein the outer housing 12 forms one electrode plate common to all four capacitors, while the conductive coating on the four concave (or underside) thin film surfaces of each of the sections 28, 30, 32 and 34 define detecting electrodes with the dielectric fluid 40 being located between the common plate and the insulating, outer surface of the inner housing 18.

As noted above, the sensor is designed to detect angular movement of the sensor relative to two mutually perpendicular axes, specifically a pitch axis P and a roll axis R, as illustrated in FIG. 1.

An electronic circuit board 42 and plastic cover 44 are secured to the sensor by means of fasteners 46 or other suitable means. Electrical contact between the sections 28, 30, 32 and 34 and the circuit board 42 is made through the elastomeric connectors 36 as described in greater detail hereinbelow.

As the sensor tilts about the roll axis R, the area within sections 30 and 34 covered by the dielectric fluid changes, and the change in covered area results in a change in capacitance which is electrically conditioned, and thereafter output at the connector 48 as a DC voltage proportional to the degree of angular rotation. A similar change in capacitance occurs for areas 28 and 32 during rotation of the sensor about the pitch axis P. Movement of fluid within the cavity is shown in phantom in FIG. 7.

Suitable circuitry, shown in FIGS. 8-9 and as described in greater detail below, is provided on the board or card 42 for detecting the change in capacitance and providing the voltage output signals.

Figure 4:
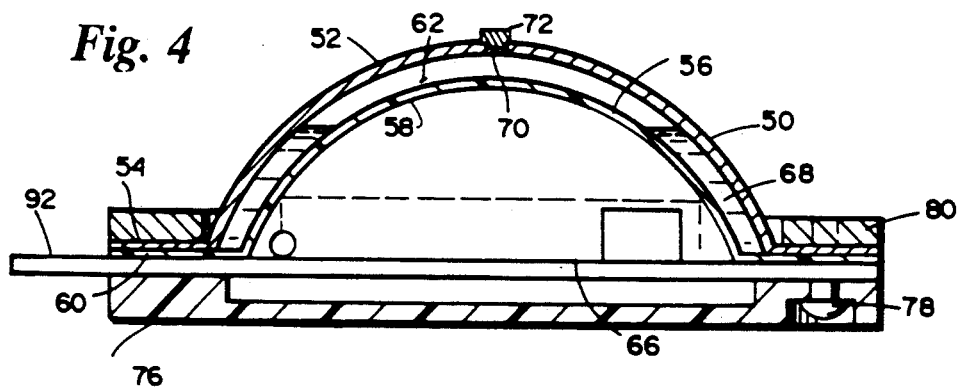
FIG. 4 is a side sectional view of a sensor in accordance with an alternative embodiment of the invention.
Figure 5:
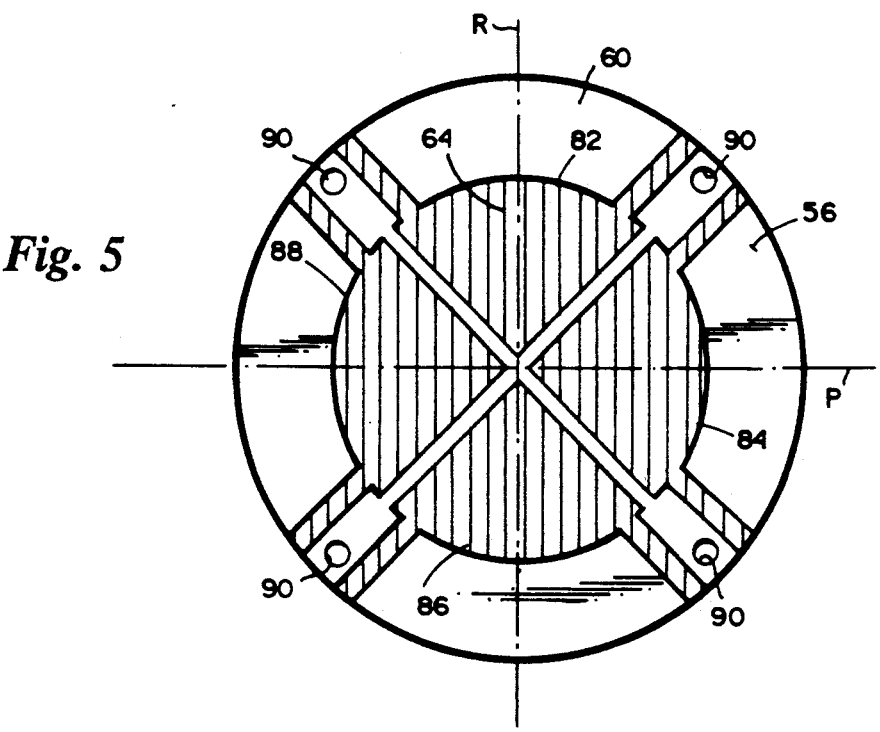
FIG. 5 is a bottom view of the underside of the inner housing of this alternative embodiment of the invention.
Figure 6:
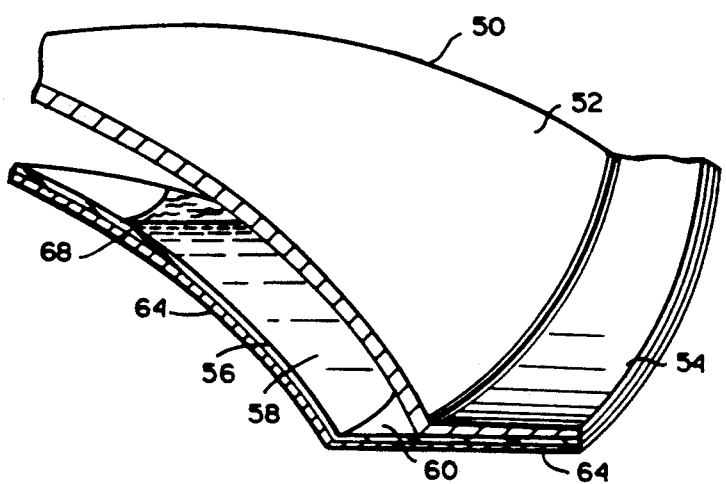
FIG. 6 is a partial perspective of the inner and outer housings of the sensor shown in FIGS. 4 and 5.

With reference now to FIGS. 4, 5 and 6, a second exemplary embodiment of the invention includes an outer housing 50 which may be formed from a sheet of ferrous or non-ferrous metal, and preferably aluminum. As in the first described embodiment, the outer housing includes a spherical section 52 and a peripheral base or flange 54. The inner housing 56 is constructed of a non-conductive plastic film, again approximately 0.010 inch thick. The inner housing 56 also has a spherical central section 58 and a peripheral flange 60. The radii of the respective housings or domes are selected to provide uniform spacing between the inner and outer housings, thereby forming a cavity 62.

The inner housing 56 can be thermally formed e.g., by application of a vacuum to a heated sheet, or it can be molded into the desired shape, or formed in any other suitable manner. In this embodiment, the plastic reinforcing ribs 22 and 24 as utilized in the previously described embodiment are not required to maintain the spherical shape of the inner housing. The concave or underside surface of the inner housing or dome 56 is selectively coated with a conductive material 64 in a pattern as illustrated in FIG. 5. The conductive coating extends to the peripheral flange area 60 of the inner housing to enable electrical contact with a circuit board assembly 66. It will be appreciated that the conductive material may be applied by other means such as silk screening or the like.

As in the previously described embodiment, the inner and outer housings or domes are hermetically sealed to each other by ultrasonic welding techniques, or by other suitable means such as induction welding, and the cavity 62 filled to 50% of the available volume with a dielectric fluid 68. The cavity 62 may be filled before the two domes are sealed together, or through a fill hole 70 formed in the outer housing 50 and sealed with a plug 72. An electrical circuit board assembly 66 and plastic cover 76 are attached to the sensor by means of four fasteners 78 extending through the cover 76, circuit board assembly 66, the flanges 54, 60 of the sensor housings, and into a force distribution ring 80 located above the sensor. Thus, it will be appreciated that flanges 54 and 60 are effectively clamped between the cover 76 and ring 80 via fasteners 78.

With reference specifically to FIG. 5, the conductive surface coating 64 is applied essentially on four quadrants of the inner or underside concave surface of the inner housing 56, thereby forming four detector electrodes 82, 84, 86 and 88. The coating extends into the flange area 60 of the inner housing so that electrical contact can be established with the board or card 66 via connectors (not shown) which extend through apertures 90. Output is via the connector 92.

The operation of this alternative embodiment of the invention is substantially as described above with respect to the first exemplary embodiment and need not be repeated here.

Figure 7:
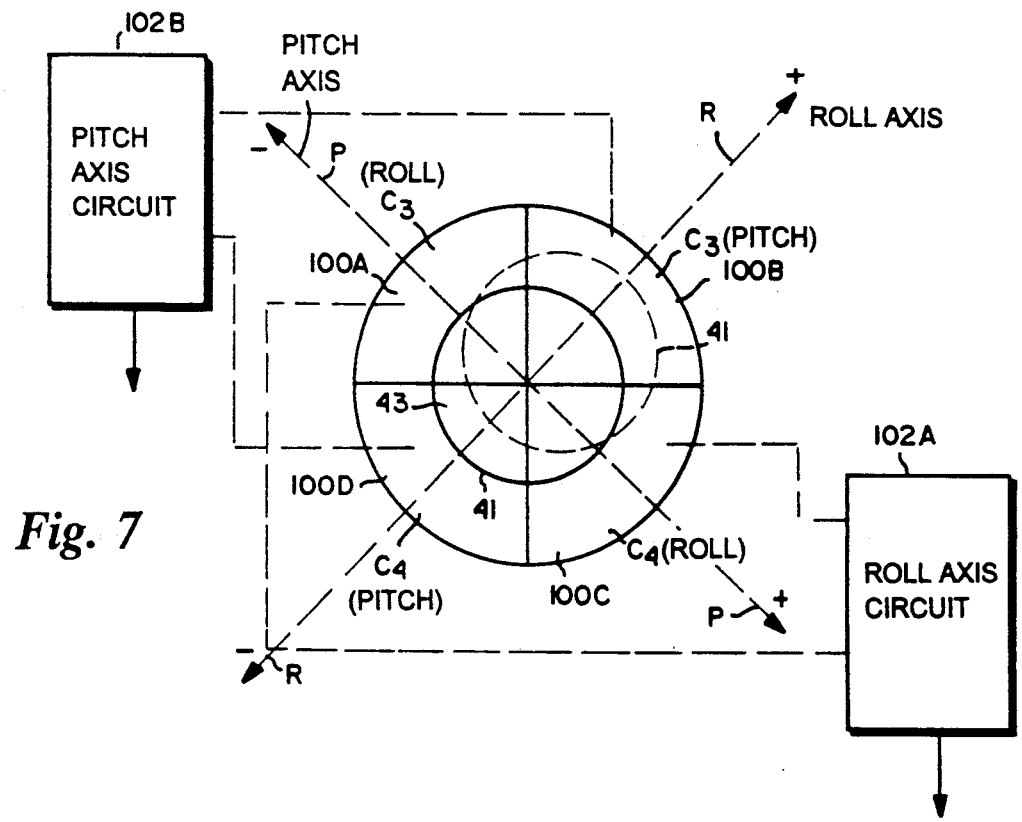
FIG. 7 is a schematic diagram of a sensor and associated circuit in accordance with the invention.

With reference now to FIGS. 7-11, a suitable electronic circuit for utilization with the sensors illustrated in FIGS. 1-6 will be described. FIG. 7 shows a schematic view of the sensor with its four "quadrant" variable capacitors 100A-100D as described above—wherein two of the capacitors (e.g., capacitors 100B, 100D) are responsive to change in sensor position along a first axis (e.g., pitch) and the other two capacitors (e.g., capacitors 100A, 100C) are responsive to change in sensor position along a second axis orthogonal to the first axis (e.g., roll).

As described above, FIG. 7 shows the quantity of dielectric fluid 43 in solid lines for a first sensor orientation and in phantom for a second, different sensor orientation—where the sensors changes orientation in the pitch axis (P) but not in the roll axis (R) to move from the first orientation to the second orientation. Specifically, in FIG. 7 the first sensor orientation is "level" (such that the area defined by the quantity of dielectric fluid 43 contained within each of the capacitor "quadrants" 100A-110D is equal), whereas in the second sensor orientation the sensor has moved through a positive pitch angle (assuming the "+" and "−" exemplary conventions shown in the drawing) but though no appreciable roll angle. Hence, the area occupied by fluid 43 within each of roll-sensitive capacitor "quadrants" 100A, 100C (these quadrants are shown as planar quarter circle areas in FIG. 7 but are each actually one-eighth of a sphere, as will be understood) does not change appreciably between the first and second sensor orientations (since the sensor orientation in the roll axis has not changed).

However, the area occupied by fluid 43 within each of pitch-sensitive quadrants 100B, 100D has changed significantly due to the change in pitch angle of the sensor. Specifically, the area occupied by fluid 43 in one of the pitch sensitive sensing quadrants (e.g., quadrant 100B) has increased by an amount Delta A, while the area occupied by fluid 43 in the other pitch sensitive sensing quadrant (e.g., quadrant 100D) has decreased by the same amount Delta A. This change in fluid occupied area causes the capacitance of the 100B sensing "quadrant" to increase by a capacitance Delta C and the capacitance of the 100D sensing "quadrant" to decrease by the same capacitance Delta C.

A roll axis circuit 102A is connected to the roll axis capacitors 100A, 100C, and a pitch axis circuit 102B is connected to the pitch axis capacitors 100B, 100D in the preferred embodiment. Circuits 102A, 102B are each responsive to their associated capacitor pairs, and provide an output signal indicative of the current sensor position angle in the roll and the pitch axes, respectively.

Circuits 102A, 102B are identical in the preferred embodiment. FIG. 8 is a block diagram of one (either) of two circuits 102. Circuit 102 includes an oscillator 104, a sensor side select state register (e.g., flip flop) 106, a low pass filter 108, and output amplifier 110, and a switching network 112 connected so as to alternately connect the capacitor 100 pair (e.g., capacitor 100A and capacitor 100C for the roll axis circuit) to the oscillator.

Switching network 112 includes a first switch 112A driven by the inverted Q output of flip flop 106 and a second switch driven by the non-inverted Q output of the flip flop (as is well known, Q and not Q have opposite logic levels). Thus, first switch 112A is open (and capacitor 100C is disconnected from oscillator 104) whenever second switch 112B is closed (and capacitor 100A is connected to the oscillator)—and vice versa.

Oscillator 104 oscillates at a frequency f dependent upon the capacitance of the one of capacitors 100 connected to it by switching network 112. The output of oscillator 104 is connected to an input of flip flop 106 which causes the flip flop to change states at the conclusion of the present period of the oscillator output signal (in the preferred embodiment, flip flop 106 changes state every time oscillator 104 produces a rising edge). Thus, oscillator 104 produces a periodic output signal with the duration of alternate periods determined by the capacitance of capacitors 100A, 100C, respectively. The top signal shown in FIG. 11, for example, is a representation of the output signal Vosc produced by oscillator 104.

The Q output of flip flop 106 similarly is a periodic signal alternating between logic level 0 and logic level 1, wherein the duration of the logic level 1 portion of the signal is controlled by the capacitance of one of capacitors 100A, 100C, while the duration of the logic level 0 portion of the signal is controlled by the capacitance of the other of capacitors 100A, 100C. The center signal shown in FIG. 11, for example, is a graphical representation of the signal Vff produced at the flip flop 106 Q output.

Flip flop 106 thus performs two functions in the preferred embodiment: it controls which of capacitors 100A, 100C are connected to oscillator 104; and it effectively divides the output signal produced by the oscillator by a factor of two (and in the process converts the oscillator cycle controlled by one of the capacitors into a pulse having a duration equal to the duration of that cycle and converts the next successive oscillator cycle controlled by the other capacitor into a "no pulse" time period having a duration equal to the duration of that next successive cycle).

Note that since the capacitance of capacitor 100A increases by the same amount as the capacitance of capacitor 100C decreases for any given change in position of the sensor along the roll axis, the sum of the durations of two successive periods produced by oscillator 104 is a constant. That is, if the duration TA of one period of an oscillation cycle outputted by oscillator 104 increases by time increment Delta T, the duration of the next period TB should decrease by the same time increment Delta T so that the sum of the two durations TA+TB is a constant. It follows, therefore that under ideal conditions the measurements provided by alternate capacitors 100A, 100C are redundant—since an increase in oscillator cycle duration controlled by one of the capacitors should be tracked by an equal decrease in oscillator cycle duration controlled by the other capacitor.

However, errors in the measurement process due to various factors (e.g., changes in sensor dimension caused by temperature changes and/or slight non-symmetry in sensor dimensions between "opposing" capacitor "quadrants") exist which prevent TA+TB from being exactly constant under actual operating conditions. The preferred embodiment thus samples what ideally is redundant information (the capacitances of capacitors 100A, 100C) every other oscillator cycle, and provides a measured output which is responsive to both samples. The result is a measurement which is much more accurate and much less affected by errors.

Figure 8:
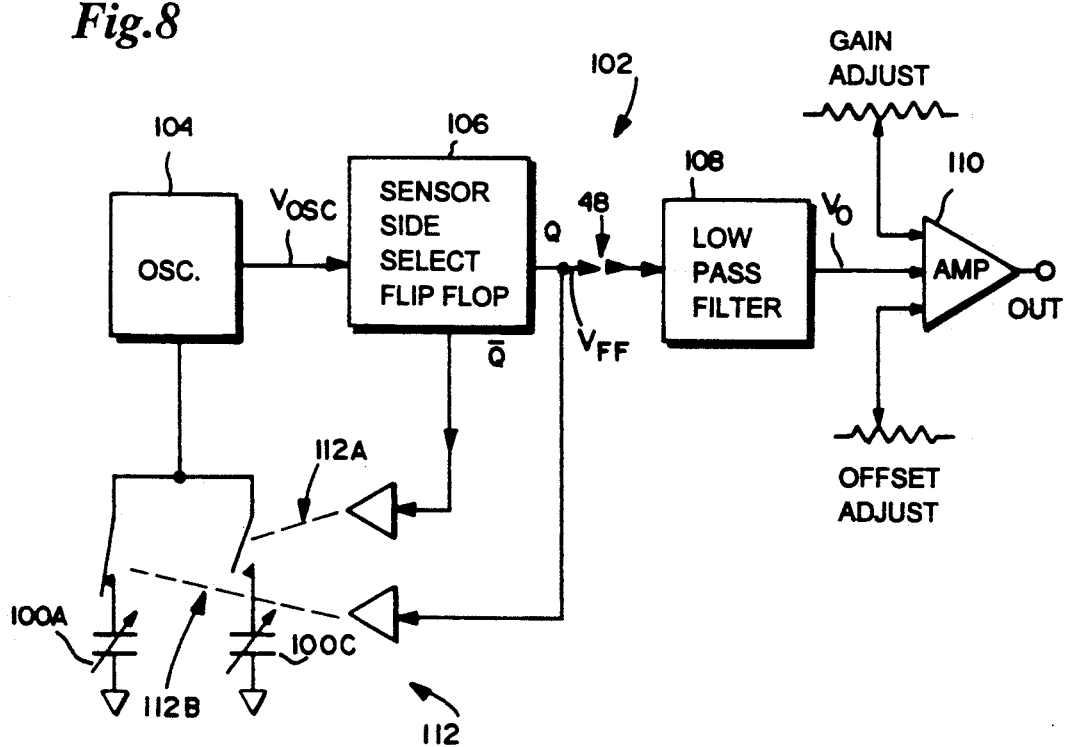
FIG. 8 is a high level block diagram of an electronic circuit for producing an output indicative of sensor angle in response to changes in capacitance as the sensor moves about an axis in accordance with the invention.

The output signal Vff produced by flip flop 106 may, if desired, be analyzed directly (e.g., by a microprocessor) to determine the duration of the pulses and the duration of the "spaces" (no pulses) between pulses in the output signal (in the preferred embodiment, in fact, the left-hand portion of the circuit shown in FIG. 8 is disposed on PC board 42 and the connector 48 discussed previously is connected to the Q output of flip flop 106 to make this output accessible if required). However, the preferred embodiment further includes low pass filter 108 and amplifier 110 which together convert the output of flip flop 106 into a voltage level proportional to the orientation of the sensor along the axis being sensed. This output voltage level may be read directly (e.g., on a calibrated voltmeter) or converted into digital form (e.g., using a conventional analog to digital converter).

Figure 11:
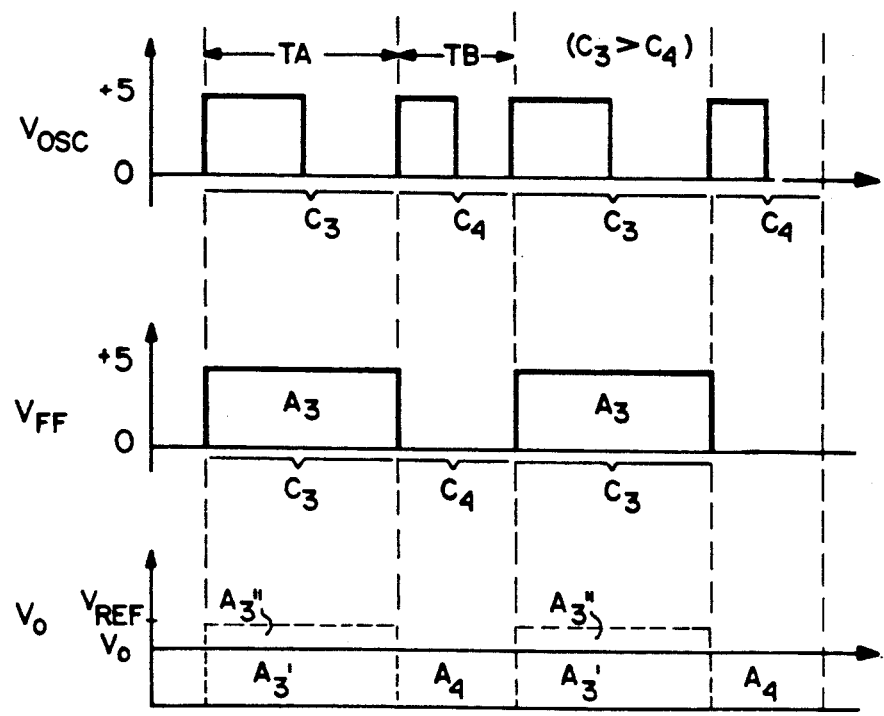

Low pass filter 108 in the preferred embodiment provides an integrating function in the preferred embodiment as is shown in the bottom signal trace of FIG. 11, for example. Specifically, low pass filter 108 generates an output voltage level which is responsive to the time integral of the output of flip flop 106 integrated over the entire time period TA+TB of the periodic signal produced by the flip flop. Looking at it another way (referring specifically to FIG. 11), the output of low pass filter 108 is a voltage level V0 responsive to the area beneath the pulses if that area is redistributed equally over the pulse and no pulse time durations TA, TB. Recall that the output of flip flop 106 can take on only two states: logic level 1 (e.g., 5.0 volts or so) during an output pulse and logic level 0 (0.0 volts or so) during a "no pulse". The area marked "A3" in FIG. 11, center trace is the area beneath a pulse produced by flip flop 106. This area is equal to the sum of a portion A3' of the area beneath the level of output signal VO and a portion of the area A3" above the level of the output signal VO (see bottom trace, FIG. 11). Low pass filter 108 causes the level of output signal VO to be such that the area of portion A3" is equal to the area A4 beneath output signal VO during no pulse. This low pass filter 108 output signal VO is buffered by amplifier 110 (which also gain and zero offset adjusts the signal) for output from the sensor.

Figure 9:
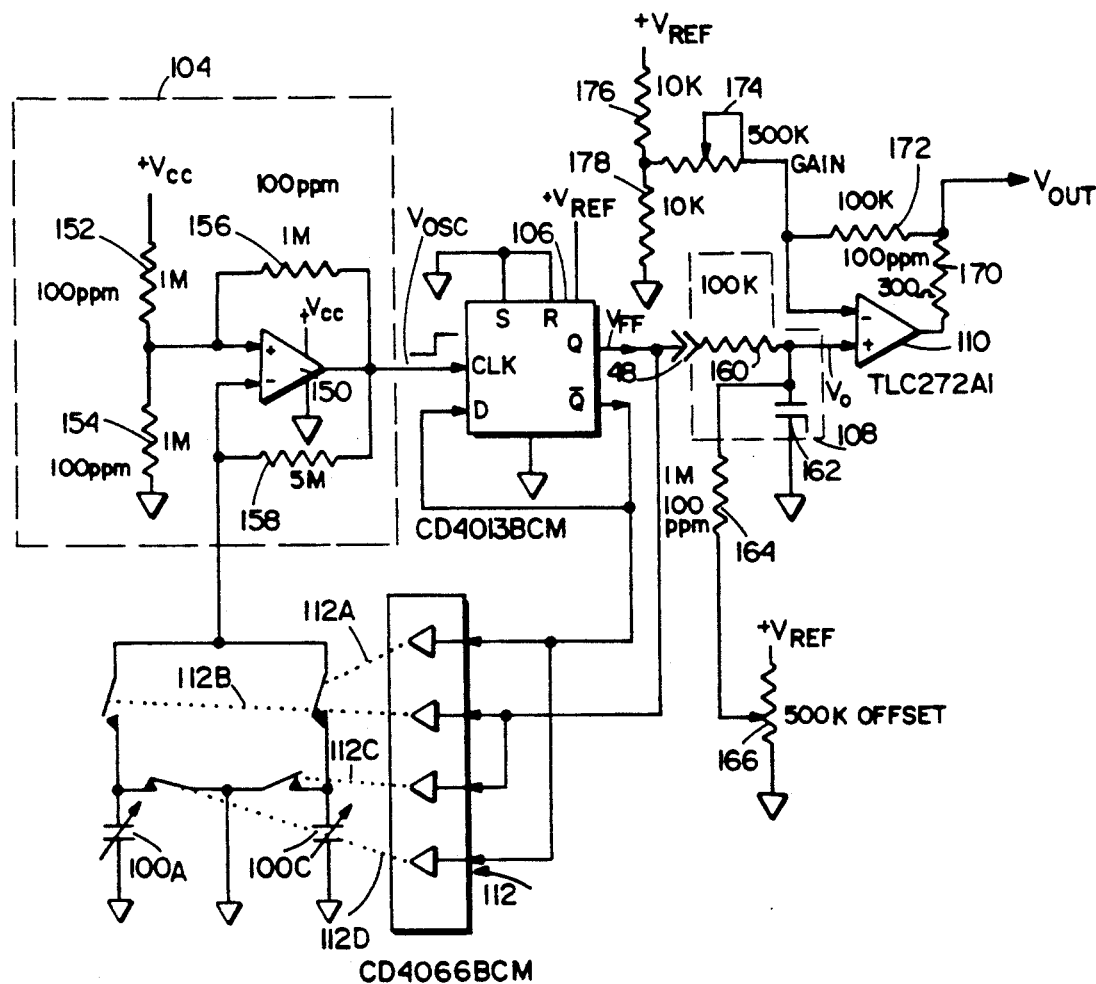
FIG. 9 is a detailed schematic diagram of the block diagram of the circuit illustrated in FIG. 8.

FIG. 9 is a detailed schematic diagram of the FIG. 8 circuit. Oscillator 104 includes a comparator circuit 150 and associated resistors 152–158. Series connected resistors 152, 154 form a voltage divider which divides Vcc (supply voltage) by 2 and applies the resulting nominal Vcc/2 level to the non-inverting input of comparator 150. A feedback resistor connects the output of comparator 150 to its non-inverting input. Feedback resistor 156 (resistors 152, 154 and 156 have equal values in the preferred embodiment) is effectively connected in parallel with one or the other of voltage divider resistors 152, 154—depending upon whether the comparator 150 output is high or low. Specifically, if the comparator 150 output is low, feedback resistor 156 is effectively connected in parallel with resistor 154 and the output voltage provided by the voltage divider network to the comparator non-inverting input is 0.33(Vcc) (the resistance of resistor 154 is effectively halved). If the comparator 150 output is high, on the other hand, feedback resistor 156 is effectively connected in parallel with resistor 152 and the voltage divider applies a voltage level of 0.67(Vcc) to the comparator non-inverting input.

Another feedback resistor 158 connects the comparator output to its inverting input. Switching network 112 connects one or the other of sensor variable capacitors 100A, 100C to the comparator inverting input (and thus to the comparator 150 output through resistor 158).

Assume comparator 150 has an initial output state of "1" (meaning a logic level high signal is present on its output and the voltage divider network provides 0.67 Vcc to the comparator non-inverting input). This high output level (which is substantially the level of Vcc) applies a current through feedback resistor 158 which charges the one of sensor capacitors 100 connected to the comparator inverting input by switching network 112. After a time (the duration of which is determined by the time constant formed from the capacitance of the sensor capacitor 100 and the value of resistor 158), the sensor capacitor will have charged to a level sufficient to apply a voltage level slightly in excess of 0.67 Vcc to the comparator 150 inverting input—which exceeds the voltage level applied by voltage divider network 152, 154 to the comparator non-inverting input. The comparator 150 at this point changes state and ceases to produce an output (thus reducing the voltage level at its non-inverting input to 0.33 Vcc). The capacitor begins to discharge through the feedback resistor (the potential at the comparator output now being approximately zero and very much less than the voltage across the charged capacitor). When capacitor 100 discharges to less than 0.33 Vcc, the level at the comparator 150 non-inverting input once again exceeds the level at its inverting input—and the comparator output changes to the high state again (causing the entire cycle to repeat).

Figure 10:
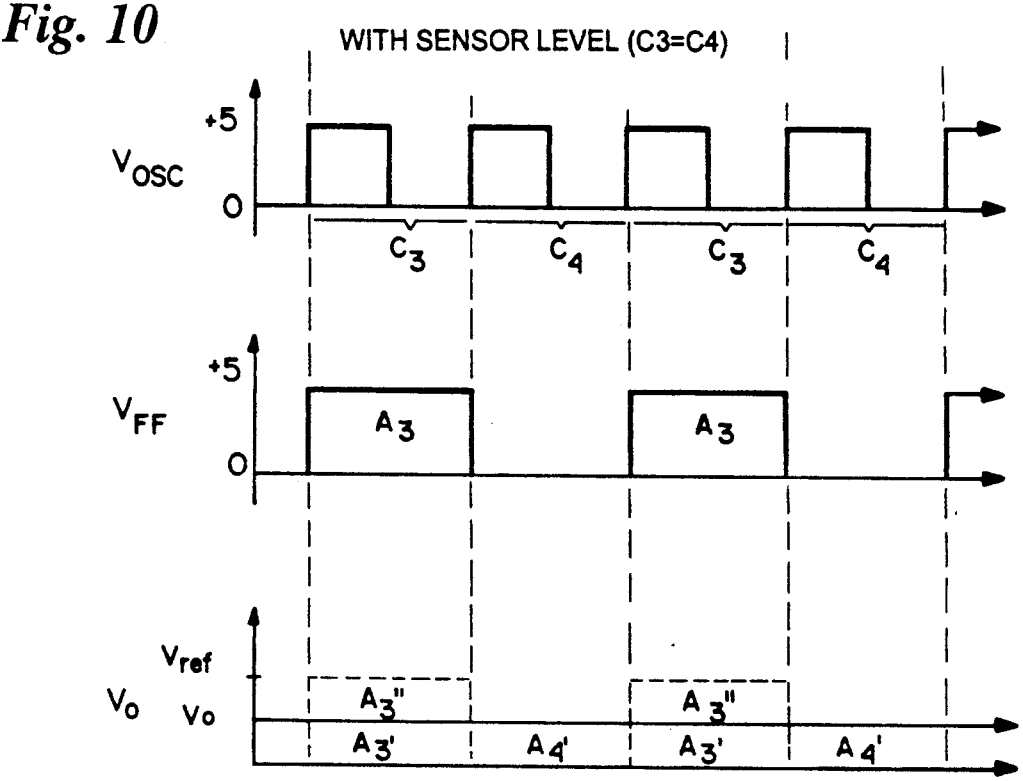
FIGS. 10 and 11 are graphical illustrations of signals associated with the circuit illustrated in FIG. 9 for level and non-level sensor orientations, respectively.

Oscillator 150 thus oscillates at a frequency dependent upon the value of the sensor capacitance. The oscillator 150 completes one full cycle using sensor capacitor 100A, and as the oscillator output transitions high, flip flop 106 is clocked by the rising edge and changes state. Flip flop 106 outputs Q and $\overline{Q}$ switch states and causes switching network 112 to select capacitor 100C as the oscillator "time" base for the next full oscillator cycle. This process then repeats with the oscillator alternatively using capacitor 100A and capacitor 100C for its "time base". The output of flip flop 106, with capacitor 100A equal to capacitor 100C (i.e., indicating level sensor orientation in the axis to which capacitors 100A, 100C are sensitive), is as illustrated in FIG. 10. When the sensor is not level, e.g., When capacitor 100A is greater than capacitor 100C, the output of flip flop 106 is as shown in FIG. 11.

Thus, the voltage at the Q output of flip flop 106 is a pulse width modulated (PWM) representation of the comparative values of sensor capacitors 100A, 100C and therefore of the sensor angle.

The PWM output from flip flop 106 is filtered by low pass filter 108 (resistor 160 and capacitor 162) to obtain a ratiometric output voltage centered about a device-level output of V supply/2. Specifically, resistor 160 in the preferred embodiment has a value of 100 KOhms, and capacitor 162 has a value of 6.8 uF to provide a 0.68 second time constant. This time constant is long enough to smooth out variations in the voltage across capacitor 162 caused by the alternating pulse/no pulse output of flip flop 106, but is short enough to provide rapid circuit response to changes in sensor orientation. A variable voltage divider network (resistor 164, potentiometer 166) applies an offset voltage across capacitor 162 so that the variations in the voltage across the capacitor are super-imposed upon a constant DC level (e.g., Vcc/2). Resistor 164, potentiometer 166 thus provide zero nulling capability. The constant DC level components 164, 166 provide thus corresponds to level sensor orientation, with lesser voltages corresponding to negative sensor angle and greater voltages corresponding to positive sensor angle. Such an output can be converted by a conventional A/D converter such that the most significant bit of the A/D output indicates the sign of the sensor angle (as will be understood by those skilled in this art). Preferably, the voltage divider comprising resistor 164, potentiometer 166 (and all other components of the FIG. 9 circuit) is driven by the Vref signal used to provide a reference voltage to the external A/D converter to prevent power supply fluctuations from degrading measurement accuracy.

Amplifier 110 operates as a linear amplifier for buffering the output voltage VO across capacitor 108. A feedback resistor (resistor 172) in conjunction with voltage divider (potentiometer 174 and resistors 176, 178) provides scale factor adjustment capability for amplifier 110.

Thus, it will be apparent that the present invention provides an accurate and reliable sensor for detecting angular motion of an object about either of two perpendicular axes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A capacitive sensing arrangement comprising:
   a spherically shaped outer member having an inner concave common electrode surface;
   an inner member disposed within said outer member, said inner member having an outer convex insulating surface and an inner concave electrically conductive surface, said inner concave electrically conductive surface being divided into first and second detecting electrodes;
   means for locating said inner member with respect to said outer member so that a cavity is defined between said inner member outer convex surface and said outer member inner concave surface;
   a quantity of dielectric fluid contained within said cavity;
   oscillator means for generating a periodically alternating electrical signal; and
   switching means connected to said first and second detecting electrodes for alternatively coupling said first detecting electrode and said second detecting electrode to said oscillator means, said switching means including state control means connected to receive said periodically alternating electrical signal for decoupling said first electrode from said oscillator means and for coupling said second electrode to said oscillator means in response to a level transition of said periodically alternating signal.

2. A sensing arrangement as in claim 1 wherein said switching means includes means for alternately coupling each of said first and second detecting electrodes to (a) said oscillator means, and (b) ground potential.

3. A sensing arrangement as in claim 1 further including:
flip flop means, connected to receive said periodically alternating electrical signal and having an output terminal, for producing a first signal level at said output terminal during a first period defined by said periodically alternating electrical signal and for producing a second signal level different from said first signal level at said output terminal during a second successive period defined by said periodically alternating electrical signal subsequent to said first period; and
integrating means connected to said flip flop means output terminal for integrating said first signal level over the duration of said first and second signal levels.

4. A capacitive sensing arrangement comprising:
a sensor housing;
first capacitive detecting means disposed within said sensor housing for providing a first capacitance C3 and for changing said first capacitance to (C3+any change in C3) in response to a particular change in the angular orientation of said sensor housing with respect to a certain axis;
second capacitive detecting means disposed within said sensor housing for providing a second capacitance C4 and for changing said second capacitance to substantially (C3−any change in C4) in response to said particular change in angular orientation of said sensor housing with respect to said certain axis;
oscillator means for generating a periodically alternating electrical signal; and
switching means connected to said first and second detecting means for alternately coupling said first detecting means and said second detecting means to said oscillator means said switching means including:
state control means connected to receive said periodically alternating electrical signal for decoupling said first electrode from said oscillator means and for coupling said second electrode to said oscillator means in response to a level transition of said periodically alternating signal.

5. A sensing arrangement as in claim 4 wherein said oscillator means comprises means for varying the period of said periodic signal in response to the capacitance of the one of said first and second detecting means coupled thereto.

6. A sensing arrangement as in claim 4 wherein said state control means including rising edge triggered flip flop means having a clock input terminal connected to receive said periodically alternating signal, said flip flop means for changing state in response to each occurrence of a rising edge of said periodically alternating signal.

7. A sensing arrangement as in claim 4 wherein said oscillator means includes:
comparator means having first and second input terminals and an output terminal, each of said terminals having a voltage level, said comparator means for producing a first output level whenever said first input terminal level exceeds said second input terminal level and for otherwise producing a second output level, said switching means being connected to said first input terminal;
charging/discharging means connected between said first input terminal and said output terminal for charging said one of said first and second capacitive detecting means coupled to said first input terminal via said switching means whenever said comparator means produces said first output level and for otherwise discharging said one of said first and second capacitive detecting means; and
means for changing said second input terminal level in response to said output terminal level.

8. A sensing arrangement as in claim 4 wherein said switching means includes means for alternately coupling each of said first and second detecting electrodes to (a) said oscillator means, and (b) ground potential.

9. A sensing arrangement as in claim 4 further including:
flip flop means, connected to receive said periodically alternating electrical signal and having an output terminal, for producing a first signal level at said output terminal during a first period defined by said periodically alternating electrical signal and for producing a second signal level different from said first signal level at said output terminal during a second successive period defined by said periodically alternating electrical signal subsequent to said first period; and
integrating means connected to said flip flop means output terminal for integrating said first signal level over the duration of said first and second signal levels.

10. A roll and pitch axes capacitive sensing arrangement comprising:
a spherically shaped outer member having an inner concave common electrode surface;
an inner member disposed within said outer member, said inner member having an outer convex insulating surface and an inner concave electrically conductive surface, said inner concave electrically conductive surface being divided into first, second, third and fourth detecting electrodes;
means for locating said inner member with respect to said outer member so that a cavity is defined between said inner member outer convex surface and said outer member inner concave surface;
a quantity of dielectric fluid contained within said cavity, said quantity of dielectric fluid between any one of said detecting electrodes and said common electrode surface varying depending upon the roll and pitch orientation of said sensory, said first and third detecting electrodes are responsive to movement in a roll direction and said second and fourth detecting electrodes responsive to movement in a pitch direction;
first oscillator means for generating a periodically alternating electrically signal; and
first switching means connected to said first and third detecting electrodes for alternately coupling said first detecting electrode and said third detecting electrode to said oscillator means, said first switching means includes state control means connected to receive said periodically alternating electrical signal for decoupling said first electrode from said oscillator means and for decoupling said third electrode to said oscillator means in response to a level transition of said periodically alternating signal;

second oscillator means for generating a periodically alternating electrical signal; and second switching means connected to said second and fourth detecting electrodes for alternately coupling said second detecting electrode and said fourth detecting electrode to said oscillator means, said second switching means includes state control means connected to receive said periodically alternating electrical signal for decoupling said second electrode from said oscillator means and for coupling said fourth electrode to said oscillator means in response to a level transition of said periodically alternately signal.

* * * * *